United States Patent
Guo et al.

(10) Patent No.: US 10,361,835 B2
(45) Date of Patent: Jul. 23, 2019

(54) SYSTEM FOR COEXISTENCE OF WI-FI HALOW NETWORK AND LOW-RATE WIRELESS PERSONAL AREA NETWORK (LR-WPAN)

(71) Applicant: Mitsubishi Electric Research Laboratories, Inc., Cambridge, MA (US)

(72) Inventors: Jianlin Guo, Newton, MA (US); Ying Liu, North Brunswick, NJ (US); Philip Orlik, Cambridge, MA (US); Yukimasa Nagai, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/626,285

(22) Filed: Jun. 19, 2017

(65) Prior Publication Data
US 2018/0367286 A1 Dec. 20, 2018

(51) Int. Cl.
*H04L 1/00* (2006.01)
*H04L 5/00* (2006.01)
(Continued)

(52) U.S. Cl.
CPC ......... *H04L 5/0064* (2013.01); *H04L 5/0062* (2013.01); *H04L 43/16* (2013.01);
(Continued)

(58) Field of Classification Search
CPC ..... H04L 5/0064; H04L 5/0062; H04L 43/16; H04W 74/0808; H04W 16/18; H04W 24/06
See application file for complete search history.

(56) References Cited

U.S. PATENT DOCUMENTS

| 10,002,530 B1 * | 6/2018 | Liu ........................ G08G 1/005 |
| 2012/0002567 A1 | 1/2012 | Sun et al. |

(Continued)

OTHER PUBLICATIONS

Zhan et al., TGah Coexistence Assurance: 11-12-0350-00-00ah-tgah-coexistence-assurance, IEEE-SA Mentor, vol. 802.11ah, pp. 1-19. Mar. 15, 2012.

(Continued)

*Primary Examiner* — Abdelnabi O Musa
(74) *Attorney, Agent, or Firm* — Gennadiy Vinokur; Hironori Tsukamoto; James McAleenan

(57) ABSTRACT

A network system for coexistence of a Wi-Fi HaLow network and a low-rate wireless personal area network (LR-WPAN) includes a receiver for receiving a wireless signal of a frequency band shared with the LR-WPAN using an LR-WPAN protocol, a sensor for detecting an energy level of the wireless signal, a memory storing a first program for performing an energy-detection (ED) clear channel assignment (CCA) control process, a processor, in connection with the sensor and the memory, for executing the first program to determine if a transmission of a packet is permitted based on the detected energy level of the wireless signal according to the ED CCA control process, and a transmitter for transmitting the packet over the frequency band according to the Wi-Fi HaLow protocol when the ED CCA control process has permitted the transmission.

20 Claims, 11 Drawing Sheets

(51) Int. Cl.
*H04L 12/26* (2006.01)
*H04W 74/08* (2009.01)
*H04W 16/14* (2009.01)

(52) U.S. Cl.
CPC ....... *H04W 16/14* (2013.01); *H04W 74/0808* (2013.01); *H04W 74/0816* (2013.01)

(56) References Cited

U.S. PATENT DOCUMENTS

| | | |
|---|---|---|
| 2013/0107830 A1 | 5/2013 | Jones et al. |
| 2015/0009907 A1* | 1/2015 | Merlin .............. H04W 74/0808 370/329 |
| 2017/0013556 A1 | 1/2017 | Tanaka et al. |
| 2017/0294949 A1* | 10/2017 | Zhang ................. H04B 7/0617 |
| 2018/0184303 A1* | 6/2018 | Egner ................... H04W 16/18 |

OTHER PUBLICATIONS

Barcelo et al., "Learning BEB: Avoiding Collisions in WLAN," 14th EUNICE open european summer school 2008, Telecom Bretagne, Brest, France, IFIP. Sep. 8, 2008, pp. 1-8.

X. Zhang et al. "Enabling Coexistence of Heterogeneous Wireless Systems: Case for ZigBee and WiFi," Proceeding MobiHoc '11 Proceedings oParis, France—May 17-19, 2011 f the Twelfth ACM International Symposium on Mobile Ad Hoc Networking and Computing Article No. 6.

\* cited by examiner

| 802.11ah Traffic (kbps) | 802.15.4g Traffic (kbps) | Receiving Rate (802.11ah) | Receiving Rate (802.15.4g) |
|---|---|---|---|
| 800 | 150 | 99.99% | 4.32% |
| 600 | 150 | 99.99% | 15.38% |
| 600 | 100 | 99.99% | 23.51% |
| 600 | 80 | 99.99% | 28.77% |
| 400 | 50 | 99.99% | 84.27% |
| 400 | 10 | 99.99% | 98.99% |
| 200 | 50 | 99.98% | 99.98% |

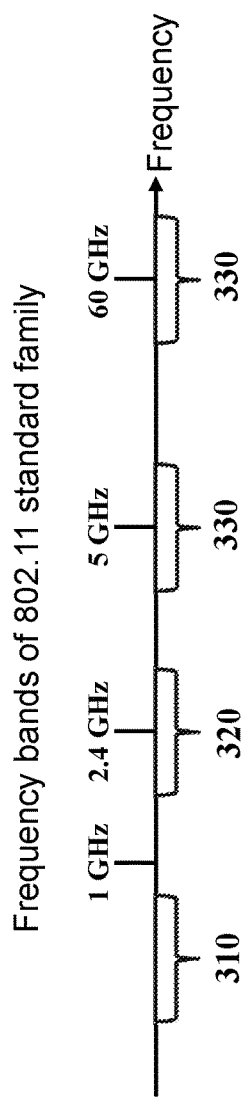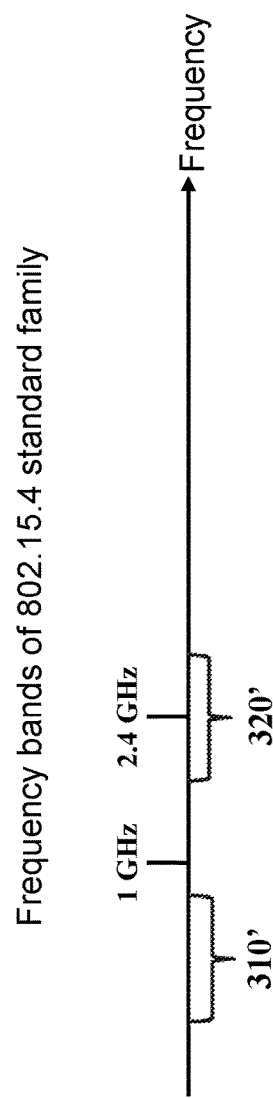
FIG. 3A
FIG. 3B

SYSTEM FOR COEXISTENCE OF WI-FI HALOW NETWORK AND LOW-RATE WIRELESS PERSONAL AREA NETWORK (LR-WPAN)

FIELD OF THE INVENTION

This invention relates to a device for coexistence of heterogeneous wireless networks, and more specifically to a device for coexistence of a Wi-Fi HaLow network and an LR-WPAN.

BACKGROUND OF THE INVENTION

A broad range of wireless communication standards emerges to cater the diverse applications. Wireless networks, the IEEE 802.11ah named Wi-Fi HaLow and the IEEE 802.15.4g named Wi-SUN, are commonly used standards among Internet of Things (IoT) and machine-to-machine (M2M) applications. The Wi-Fi HaLow standard is designed for operations at Sub-1 GHz (S1G) band, and is a low power standard developed for outdoor IoT applications. The Wi-SUN standard is designed for wireless smart utility networks (Wi-SUN) to operate at Sub-1 GHz (S1G) band and 2.4 GHz band, and includes frequency spectra (band) shared with the Wi-Fi HaLow standard. Wi-SUN is one example of LR-WPAN. There can be tens of thousands 802.11ah and 802.15.4g devices co-located in the neighborhood. As the IEEE 802.15.4g standard was designed for only allowing coexistence with the other 802.15.4g devices prior to designing the IEEE 802.11ah standard, the 802.11ah network could cause severe interference with the 802.15.4g network.

Accordingly, it is desirable to provide a new coexistence control system and a method for co-locating the 802.11ah network and the 802.15.4g network in an area.

SUMMARY OF THE INVENTION

Some embodiments according to the present disclosure are based on recognition and appreciation of the fact that a network system for coexistence of a Wi-Fi HaLow network and a Wi-SUN network (or an LR-WPAN) is provided by performing an energy-detection (ED) clear channel assignment (CCA) control process.

The network system includes a receiver for receiving a wireless signal of a frequency band shared with the LR-WPAN using an LR-WPAN protocol; an detector for detecting an energy level of the wireless signal; a memory storing a first program for performing an energy-detection (ED) clear channel assignment (CCA) control process; a processor, in connection with the detector and the memory, for executing the first program to determine if a transmission of a packet is permitted based on the detected energy level of the wireless signal according to the ED CCA control process; and a transmitter for transmitting the packet over the frequency band according to a Wi-Fi HaLow protocol when the ED CCA control process has permitted the transmission.

Further, some embodiments are based on recognition and appreciation of the fact that a network device for coexistence of a Wi-Fi HaLow network and an LR-WPAN is provided according to a Q-Learning backoff control.

The network device includes a receiver for receiving a wireless signal of a frequency band shared with the LR-WPAN using an LR-WPAN protocol; a memory for storing a Q-Learning backoff control program for performing a backoff control process; a processor, in connection with the memory, for executing the Q-Learning backoff control program to determine if a transmission of a packet is permitted; and a transmitter for transmitting the packet over the wireless channel according to a Wi-Fi HaLow protocol when the backoff control process permits the transmission.

Another embodiment is based on recognition and appreciation of the fact that a non-transitory computer-readable medium storing software for coexistence of a Wi-Fi HaLow network and an LR-WPAN is provided by performing an energy-detection (ED) clear channel assignment (CCA) control process.

A non-transitory computer-readable medium storing software for coexistence of a Wi-Fi HaLow network and an LR-WPAN comprising instructions executable by one or more computers which, upon such execution, cause the one or more computers to perform operations includes receiving a wireless signal of a frequency band shared with the Wi-SUN network (or the LR-WPAN) using an LR-WPAN protocol; detecting an energy level of the wireless signal; storing a first program for performing an energy-detection (ED) clear channel assignment (CCA) control process; executing the first program to determine if a transmission of a packet is permitted based on the detected energy level of the wireless signal according to the ED CCA control process; and transmitting the packet over the frequency band according to the Wi-Fi HaLow protocol when the ED CCA control process has permitted the transmission.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3A shows operating frequency bands of the 802.11 standard family;

FIG. 3B shows operating frequency bands of the 802.15.4 standard family;

Figure 1A:
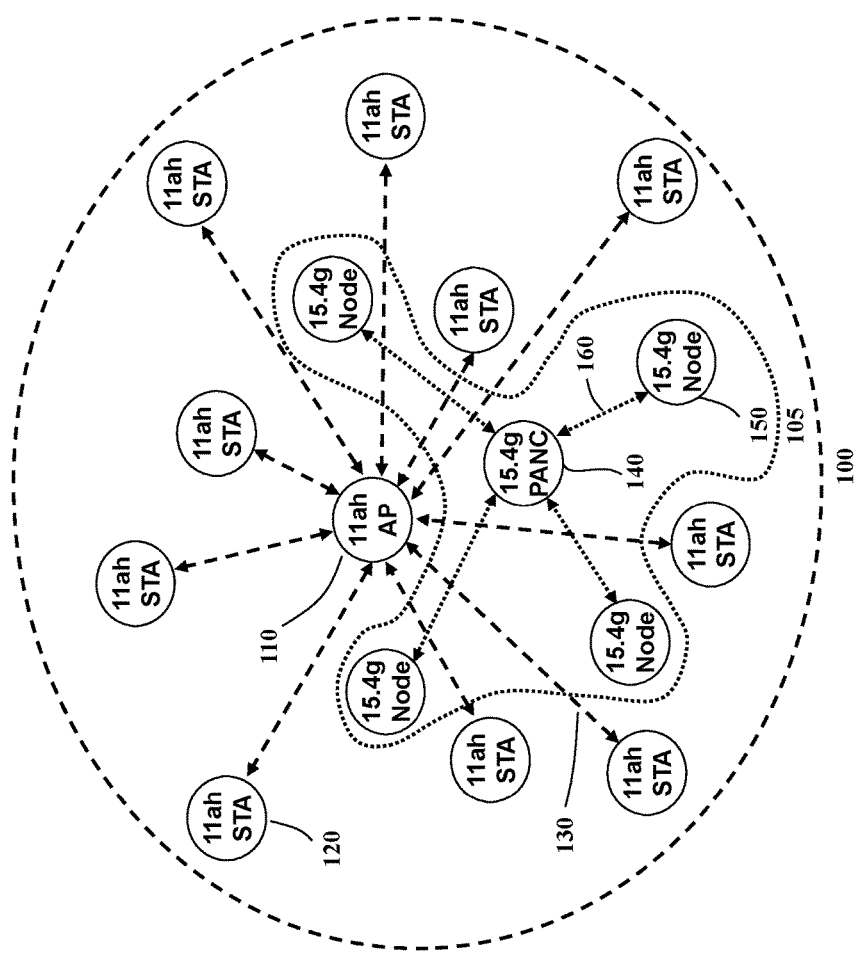
FIG. 1A is a schematic diagram illustrating a system consisting of co-located networks of 802.11ah and 82.15.4g standards, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and sprit of the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Modules and networks exemplified in the present disclosure may be computer programs, software or instruction codes, which can execute instructions using one or more processors. Modules and networks may be stored in one or more storage devices or otherwise stored into computer readable media such as storage media, computer storage media, or data storage devices (removable and/or non-removable) such as, for example, magnetic disks, optical disks, or tape, in which the computer readable media are accessible from the one or more processors to execute the instructions.

Computer storage media may include volatile and non-volatile, removable and non-removable media implemented in any method or technology for storage of information, such as computer readable instructions, data structures, program modules, or other data. Computer storage media may be RAM, ROM, EEPROM or flash memory, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both using one or more processors. Any such computer storage media may be part of the device or accessible or connectable thereto. Any application or module herein described may be implemented using computer readable/executable instructions that may be stored or otherwise held by such computer readable media.

In the following, discussions will be made on interference of wireless communications regarding the 802.11ah standard and the 802.15.4g standard before describing embodiments of the present disclosure for clarifying requirements found in a related technology.

In the following, the 802.15.4g network will be discussed as an example of one of the LR-WPANs. However, it should be noted that general IEEE 802.15.5 standard based networks (LR-WPANs) and LR-WPAN devices may be used instead of the 802.15.4g network or 802.15.4g network device. Accordingly, the Wi-SUN network is described as one of examples of LR-WPANs in the present disclosure.

FIG. 1A is a schematic diagram illustrating a network system consisting of an 802.11ah network 100 co-located with an 802.15.4g network 105 in an area. The 802.11ah network 100 contains an access point (AP) 110 and its associated stations (STAs) 120, in which the AP 110 and the STAs 120 communicate via an 802.11ah wireless link 130. The 802.15.4g network 105 contains a personal area network coordinator (PANC) 140 and its associated nodes 150. The PANC 140 and the nodes 150 communicate through an 802.15.4g wireless link 160. In this case, two networks are co-located close enough so that the 802.15.4g network 105 is within the communication range of the 802.11ah network 100. Therefore, one network can interfere with the other network when the operating channels of the two networks share frequency spectrum or overlap each other over their frequency spectrum.

Figures 1B, 1C:
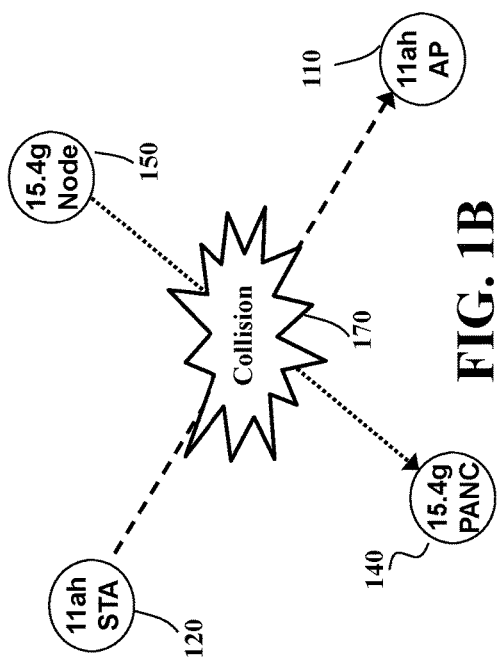
FIG. 1B is a schematic diagram illustrating an example of packet transmission collisions caused in co-located networks of 802.11ah and 802.15.4g standards.
FIG. 1C is a table indicating estimated sample data packet receiving rates of co-located networks of the 802.11ah and 802.15.4g standards using coexistence control mechanisms provided in the 802.11ah standard.

FIG. 1B is a schematic diagram illustrating a situation where packet transmission collisions are caused by the 802.11ah network 100 and the 802.15.4g network 105. In this case, the 802.11ah STA 120 is transmitting a packet to the 802.11ah AP 110 and the 802.15.4g node 150 is also transmitting a packet to the 802.15.4g PANC 140. As a result, simultaneous transmissions of two networks result in collision 170.

FIG. 1C shows a table indicating simulation results of data packet receiving rates corresponding to different network traffic rates when the co-located 802.11ah network and 802.15.4g network share frequency band and the coexistence mechanisms of the 802.11ah standard are used for coexistence control. FIG. 1C indicates that the 802.15.4g network suffers if the network traffic is heavy. The 802.15.4g network delivers only 84% of packets even if the 802.15.4g traffic rate is 50 kbps while the 802.11ah traffic rate is 400 kbps. On the other hand, the 802.11ah network achieves near 100% of packet receiving rate for all traffics. These results indicate that further coexistence control is required when network traffic is heavy. Moreover, the need for a coexistence control increases rapidly as the system traffic grows. In the present disclosure, the 802.11ah protocol may be referred to as the Wi-Fi HaLow protocol, and the 802.15.4g protocol may be referred to as the Wi-SUN protocol.

Figure 2:
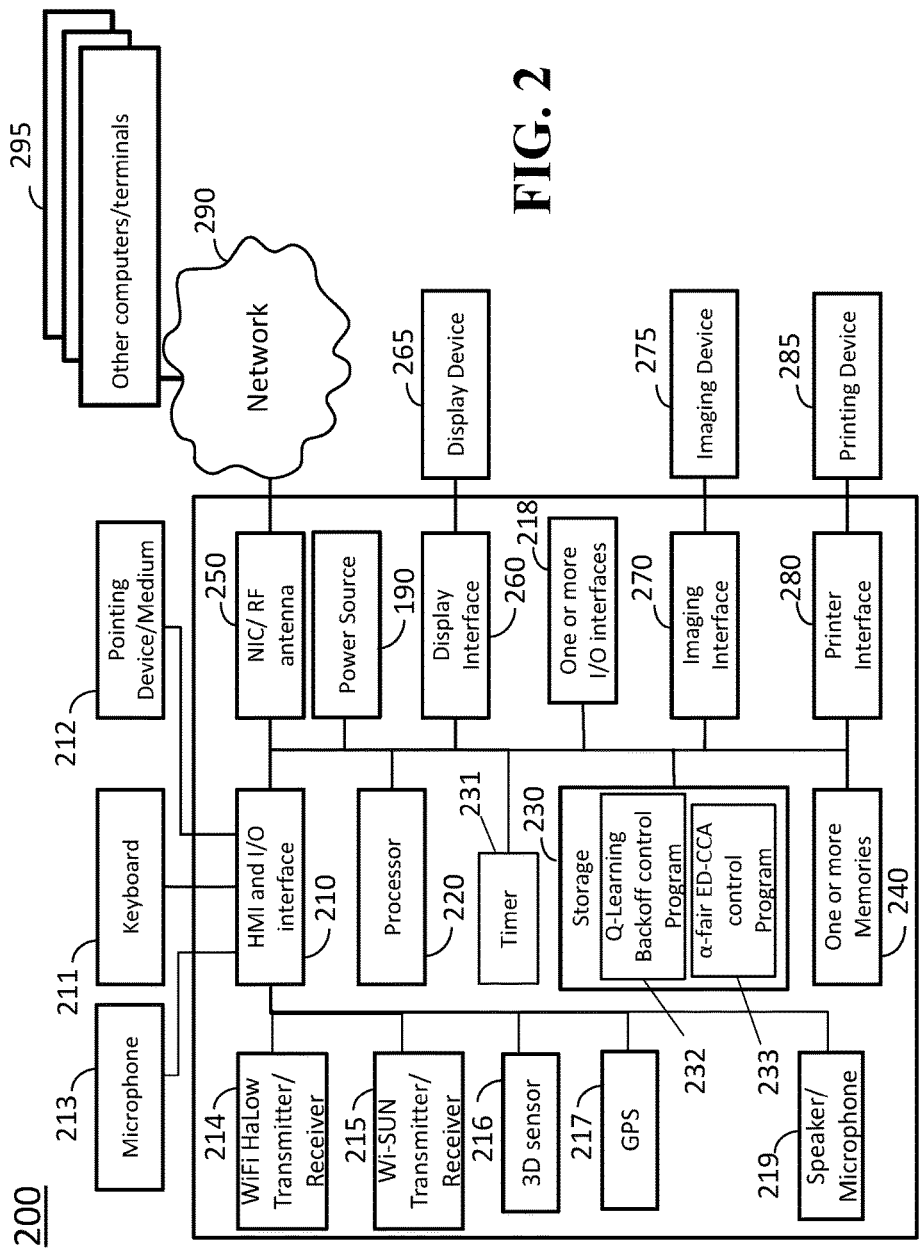
FIG. 2 is a block diagram illustrating a system participating in forming the networks of FIG. 1A, according to embodiments of the invention.

FIG. 2 shows a block diagram of an 802.11ah network system 200, according to embodiments of the present disclosure. The 802.11ah network system 200 may include multiple network devices and may be referred to as a Wi-Fi HaLow network system 200. The Wi-Fi HaLow network system 200 may include a human machine interface (HMI) with input/output (I/O) interface 210 connectable with a keyboard 211 and a pointing device/medium 212. Further, the Wi-Fi HaLow network system 200 may include a microphone 213, a Wi-Fi HaLow transmitter/receiver 214, a Wi-SUN transmitter/receiver 215, a 3D sensor 216, a global positioning system (GPS) 217 for notifying the location of the Hi-Fi Halow network system 200 to a control system (not shown) outside of the Hi-Fi Halow network system 200 via the network 290, one or more I/O interfaces 218, a speaker/microphone 219, a processor 220, a storage device 230, a timer 231, one or more memories 240 operable in association with the processor 220, a network interface controller 250 (NIC) connectable with other computers/ terminals 295 via a network 290 including local area networks, wireless networks (not shown) and internet network (not shown), a display interface 260 connected to a display device 265, an imaging interface 270 connectable with an imaging device 275, a printer interface 280 connectable with a printing device 285. The storage device 230 stores a Q-Learning Backoff control program 232 and an α-fair ED-CCA control program 233. The programs 233 can be stored into a non-transit computer readable medium (not shown) connectable with the one or more I/O interfaces 218.

Further, the one or more I/O interfaces 218 can be connected to an access point of Wi-Fi HaLow networks to provide information regarding permission of packet transmission to the Wi-SUN network.

The HMI with I/O interface 210 may include analog/ digital and digital/analog converters. The HMI with I/O interface 210 includes a wireless communication interface that can communicate with other 3D point cloud display systems or other computers via wireless internet connections or wireless local area networks, which enable to construct multiple 3D point clouds. The 802.11ah network system 200 can include a power source 290. The power source 290 may be a battery rechargeable from an external power source (not shown) via the one or more I/O interfaces 218. Depending upon the application the power source 190 may be located outside of the 802.11ah network system 200. The timer 231 may be a timer circuit, a logical circuit, or a software timer stored in the storage 230. The timer 231 operates as a timer by associating with the Q-Learning Backoff control program 232 and the α-fair ED-CCA control program 233 stored in the storage device 230. The network interface controller 250 (NIC) may include RF antennas to communicate with the 802.11ah devices and 802.15.4g devices and to detect energy levels of transmitted packets regarding the 802.11ah and 802.15.4g devices. In some cases, the Wi-Fi HaLow transmitter/receiver module 214 may include the RF antennas for receiving and transmitting packets with respect to the 802.11ah devices, and the Wi-SUN transmitter/receiver module 215 may include the RF antennas for receiving and transmitting packets with respect to the 802.15.4g devices.

The Wi-Fi HaLow transmitter/receiver module 214 may be referred to as a Wi-Fi HaLow module 214 that performs communications with other Wi-Fi HaLow devices via the 11ah access point 110 according to the Wi-Fi HaLow protocol. The Wi-SUN transmitter/receiver 215 may be referred to as a Wi-SUN circuit 215. The Wi-SUN circuit 215 is capable of performing communications with other Wi-SUN devices via the personal area network coordinator (PANC) 140 according to the Wi-SUN protocol. In some cases, an LR-WPAN transmitter/receiver may be used as the Wi-SUN transmitter/receiver 215. In such a case, the LR-WPAN transmitter/receiver may be referred to as LR-WPAN circuit including RF antennas for receiving and transmitting packets according to an LR-WPAN protocols with respect to general 802.15.4 standard devices.

In some cases, the Wi-Fi HaLow module 214 may include a timer 231, its own processor (not shown) with a memory (not shown) storing the α-fair ED-CCA control program 233 for performing the α-fair ED-CCA control. Further, the Q-Learning Backoff control program 232 may be included in the memory of the Wi-Fi HaLow module 214.

Each of the Wi-Fi HaLow module 214 and the Wi-SUN module 215 may include receiving and transmitting antennas (not shown) with energy detectors (not shown). Each of the energy detectors may be referred to as a sensor. Each energy detector is capable of detecting an energy level of packet transmissions of the 802.11ah devices and the 802.15.4g by receiving signals via the receiving antennas of the Wi-Fi HaLow transmitter/receiver 214 and Wi-SUN device transmitter/receiver 215 or the antenna of 250 in the network system 200, according to embodiments of the present invention.

The HMI and I/O interface 210 and the I/O interface 218 can be adapted to connect to another display device (not shown) including a computer monitor, camera, television, projector, or mobile device, among others.

The 802.11ah network system 200 can receive packet data from the other computers 295 via the network 290 connected to the NIC 250. The storage device 230 includes the Q-Learning Backoff control program 232 and the α-fair ED-CCA control program 233, in which algorithms of the Q-Learning Backoff control program 232 and the α-fair ED-CCA control program 233 are stored into the storage device 230 as program code data. The algorithms of the Q-Learning Backoff control program 232 and the α-fair ED-CCA control program 233 may be stored to a non-transitory computer readable recording medium (not shown) so that the processor 220 can execute the algorithms of the Q-Learning Backoff control program 232 and the α-fair ED-CCA control program 233 by loading the algorithms from the medium. Further, the pointing device/medium 212 may include modules that read and perform programs stored on the non-transitory computer readable recording medium.

In some cases, a network device may be designed by selecting or combining parts included in the 802.11ah network system 200. For instance, the network device may include, at least, the Wi-Fi HaLow transmitter/receiver module 214 having transmission/receiving antennas, a sensor for detecting an energy level of the wireless signal regarding a Wi-Fi HaLow network and a Wi-SUN network, the processor 220, the storage 230 storing the α-fair ED-CCA control program 233, the one or more memories 240 operable in association with the processor 220.

Further, another network device may be designed by selecting or combining parts included in the 802.11ah network system 200. For instance, the other network device may include, at least, the Wi-Fi HaLow transmitter/receiver module 214 having transmission/receiving antennas, a sensor (not shown) for detecting an energy level of the wireless signal regarding a Wi-Fi HaLow network and a Wi-SUN network, the storage 230 storing the α-fair ED-CCA control program 233, the one or more memories 240 operable in association with the processor 220, the timer 231 operating as a timer by associating with the Q-Learning Backoff control program 232. Further, the sensor may be referred to as a detector.

In order to start performing the algorithms of the Q-Learning Backoff control program 232 and the α-fair ED-CCA control program 233, instructions may be transmitted to the system 200 using the keyboard 211, the pointing device/medium 212 or via the wireless network or the network 290 connected to other computers 295. The algorithms of the Q-Learning Backoff control program 232 and the α-fair ED-CCA control program 233 may be started in response to receiving an acoustic signal of a user by the microphone 213 using pre-installed conventional speech recognition program stored in the storage device 230. Further, the 802.11ah network system 200 includes a turn-on/off switch (not shown) to allow the user to start/stop operating the 802.11ah network system 200.

The HMI and I/O interface 210 may include an analogy-digital (A/D) converter, a digital-analogy (D/A) converter and wireless signal antenna for connecting the network 290. Further the one or more than one I/O interface 218 may be connectable to a cable television (TV) network or a conventional television (TV) antenna receiving TV signals. The RF signals received via the interface 218 can be converted into digital images and audio signals, in which communications between the 802.11ah network system 200 and other 802.11ah network devices can be performed according to the Q-Learning Backoff control program 232 or the α-fair ED-CCA control program 233 in connection with the processor 220 and the one or more memories 240.

The processor 220 may be a plurality of processors including one or more than graphics processing units (GPUs).

FIG. 3A shows the operation frequency bands of devices according to the IEEE 802.11 standards. The 802.11 standard devices can operate on different frequency bands indicated as 310, 320, 330 and 330. For example, 802.11ah devices operate on Sub-1 GHz (S1G) band 310, 802.11b/g/n devices operate on 2.4 GHz band 320, 802.11a/n devices operate on 5 GHz band 330 and 802.11ad devices operate on 60 GHz band 340. On the other hand, as shown in FIG. 3B, 802.15.4 devices can operate on S1G band 310' and 2.4 GHz band 320' only. The common frequency band for 802.11ah and 802.15.4g is S1G band 310.

Figure 4A:
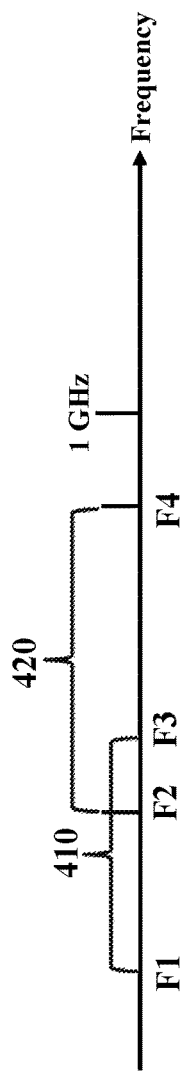
FIG. 4A shows an example of the co-located 802.11ah network and 802.15.4g network operating on frequency channels that share frequency bands.
Figure 4B:
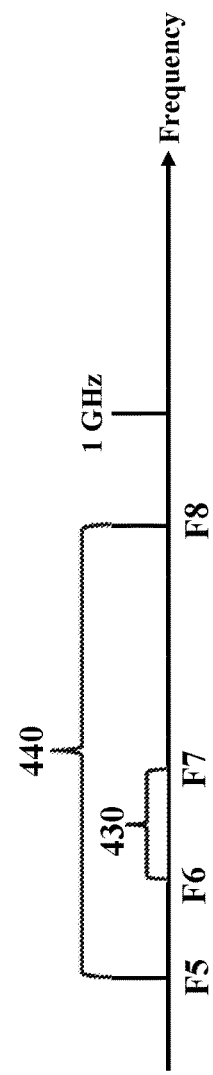
FIG. 4B shows an example of the co-located 802.11ah network and 802.15.4g network operating on overlapped frequency bands.

At S1G band 310, an 802.11ah network and an 802.15.4g network may operate on frequency channels sharing a frequency band, which causes interference between two networks. There are two types of frequency band sharing. The first type of frequency band sharing is partial sharing as shown in FIG. 4A. In this case, the 802.11ah network operates on a channel 410 ranging from a starting frequency F1 to an ending frequency F3, and the 802.15.4g network operates on a channel 420 ranging from a starting frequency F2 to an ending frequency F4. The frequency band [F2, F3] is shared by the channels 410 and 420. On the other hand, the second type of frequency band sharing is a method of overlapping frequencies as shown in FIG. 4B. In this case, the 802.11ah network operates on a channel 430 ranging from a starting frequency F6 to an ending frequency F7, and the 802.15.4g network operates on a channel 440 ranging from a starting frequency F5 to an ending frequency F8. Since the frequencies of the channels 430 and 440 are expressed as F5<F6 and F7<F8, the channel 430 is overlapped by the channel 440.

In the above, although we have exemplary discussed on frequency band sharing between the 802.11ah network and the 802.15.4g network, the communication method used in the 802.11ah network according to the present disclosure can be used with other 920 MHz frequency bands, which are used in the networks such as a Low Power Wide Area Network (e. g. LoRa Alliance™ Technology or LoRaWAN™: LoRa network and an SigFox network (e. g. 868 MHz in Europe and 902 MHz in the US).

Discussions will be made blow about why the 802.11ah network can severely impact the 802.15.4g network. Two causes are identified according to some embodiments of the present disclosure.

Interference Caused by Higher Energy Detection (ED) Threshold of 802.11ah

The 802.11ah standard defines energy detection (ED) thresholds, −75 dBm for a 1 MHz channel, −72 dBm for a 2 MHz channel, −69 dBm for a 4 MHz channel, and −66 dBm for an 8 MHz channel In this case, the minimum ED threshold is −75 dBm.

The 802.15.4g ED threshold is arranged to be lower than the 802.11ah ED threshold. For a multi-rate and multi-regional orthogonal frequency division multiplexing (MR-OFDM) physical layer (PHY), an ED threshold is arranged in [−100 dBm, −78 dBm]. For a multi-rate and multi-regional offset quadrature phase shift keying (MR-O-QPSK) PHY, the ED threshold is arranged in [−100 dBm, −80 dBm]. For a multi-rate and multi-regional frequency shift keying (MR-FSK) PHY, the ED threshold is set in [−100 dBm, −78 dBm]. The 802.15.4g ED threshold is arranged at an energy level to be 10 dB greater than the 802.15.4g receiver sensitivity (RS).

Figure 5:
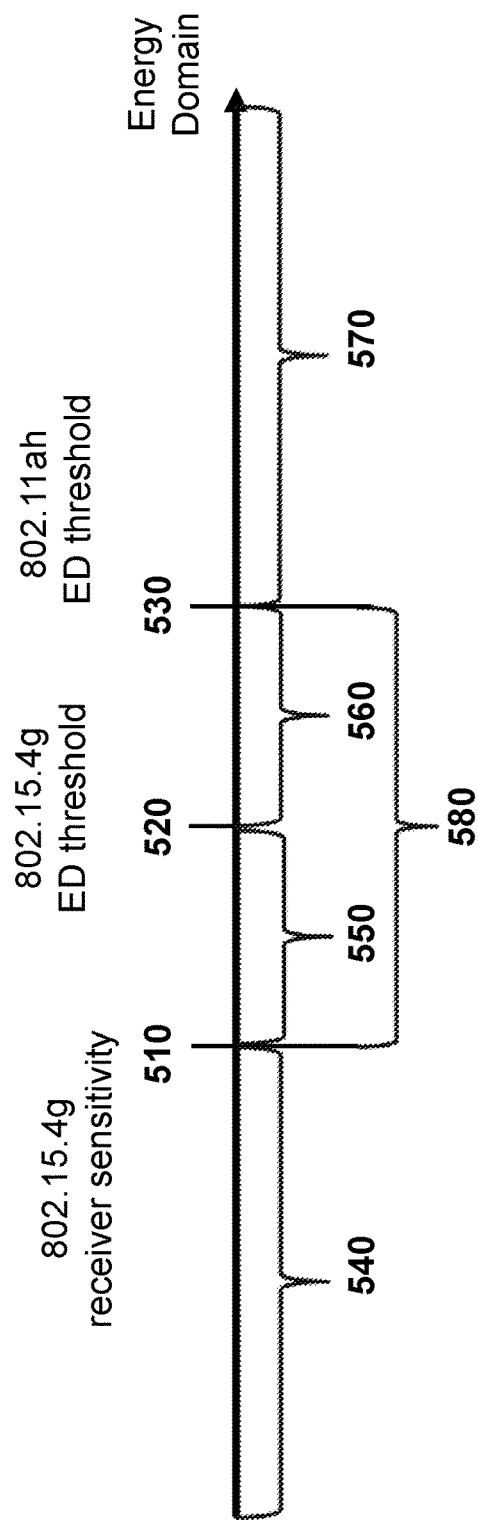
FIG. 5 shows the energy range in which 802.11ah devices interfere with 802.15.4g devices due to higher energy detection threshold of 802.11ah.

FIG. 5 is a schematic diagram illustrating the distribution of 802.15.4g receiver sensitivity 510, the 802.15.4g ED threshold 520 and the 802.11ah ED threshold 530 in an energy domain. These three thresholds 510, 520 and 530 divide the energy domain into four energy ranges 540, 550, 560 and 570. The range 540 represents energy levels less than the 802.15.4g receiver sensitivity 510, the range 550 represents energy levels greater than the 802.15.4g receiver sensitivity 510 but less than the 802.15.4g ED threshold 520, the range 560 represents energy levels greater than the 802.15.4g ED threshold 520 but less than the 802.11ah ED threshold 530, and the range 570 represents energy levels greater than the 802.11ah ED threshold 530. For instance, the value of the 802.15.4g receiver sensitivity 510 may be approximately −90 dBm, and the value of the 802.11ah ED threshold 530 may be approximately −75 dBm.

A higher energy level of the 802.11ah ED threshold enables an 802.11ah transmission to collide with an 802.15.4g transmission. If the detected energy level of a packet transmission by an 802.15.4g device is in the energy range 540, the packet is likely unreadable by the 802.15.4g device. Accordingly, it is acceptable for an 802.11ah device to ignore the packet transmission of the 802.15.4g device. If the detected energy level of the 802.15.4g packet transmission is in the range 570, the 802.11ah device handles the detected packet transmission using the 802.11ah coexistence mechanisms. However, if the detected energy level of the 802.15.4g packet transmission is in range 550 or range 560, the packet is readable by the 802.15.4g device, and the 802.11ah device ignores the detected packet transmission since the detected energy level is lower than the 802.11ah ED threshold 530. In this case, if the backoff counter of the 802.11ah device reaches to zero, the 802.11ah device will start transmission that collides with ongoing 802.15.4g packet transmission. Therefore, the 802.11ah coexistence mechanism ignores the 802.15.4g packet transmission if the detected energy level of 802.15.4g packet transmission falls in the energy range 580, i.e., union of the energy ranges 550 and 560. As a result, if the backoff counter reaches to zero, the 802.11ah device transmits a packet, which collides with ongoing 802.15.4g packet transmission. Therefore, 802.11ah ED-CCA mechanism must be enhanced in order to detect more 802.15.4g packets with lower transmission power.

Interference Caused by Backoff Processes of 802.11ah

The 802.11ah backoff process is much faster than the 802.15.4g backoff process because the 802.11ah standard uses time parameters much shorter than time parameters of 802.15.4g standard. For example, an 802.11ah time slot is 52 µs, the distributed interframe space (DIFS) is 264 µs, a short interframe space (SIFS) is 160 µs, a clear channel assignment (CCA) time is less than 40 µs and a CCA process to transmission (TX) turnaround time is less than 5 µs. For the 802.15.4g standard, the corresponding parameters depend on symbol rate. For symbol rate=62.5 ksymbol/s, backoff period is 320 µs, acknowledgment (ACK) waiting time is 1280 µs, SIFS is 192 µs, the CCA time is 128 µs and CCA to TX turnaround time is 192 µs. These backoff parameters are even longer for smaller symbol rate, e.g., if the symbol rate=20 ksymbol/s, the ACK waiting time is 1600 µs.

Another key difference between the 802.11ah backoff and the 802.15.4g backoff lies in the CCA operations. The 802.11ah device performs CCA operation in each backoff slot. However, the 802.15.4g device only performs CCA operation at the end of backoff process. This indicates that the 802.15.4g device may have less chance to detect the interference caused by the 802.11ah device. Accordingly, the transmissions of the 802.15.4g device could severely be interfered by the transmissions of the 802.11ah device.

Figure 6A:
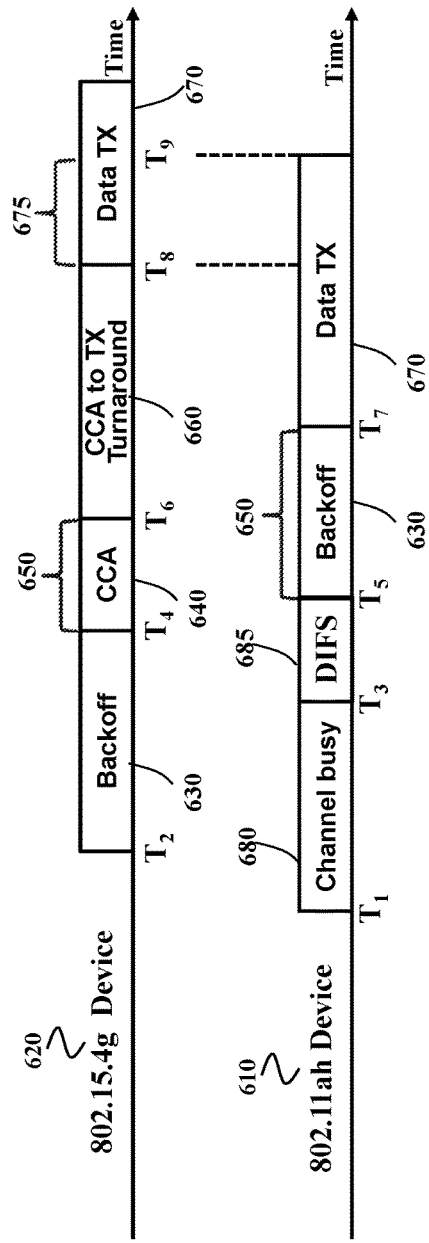
FIG. 6A shows an example of 802.11ah device transmission interfering with 802.15.4g data packet transmission due to faster backoff mechanism of 802.11ah.

FIG. 6A is a schematic illustrating 802.11ah data transmission interferes with 802.15.4g data transmission if 802.11ah backoff takes 6 time slots or less than 6 time slots. At time $T_1$, 802.11ah device 610 starts transmission process and detects channel being busy 680, so it performs the CCA operation at each time slot to monitor channel status. At time $T_2$, 802.15.4g device 620 starts its transmission process. Without performing the CCA operation, 802.15.4g device 620 starts backoff procedure 630 immediately. At time $T_3$, channel becomes idle and thus, 802.11ah device 610 waits for DIFS time period 685 to start its backoff procedure 630. At time $T_4$, the 802.15.4g device 620 completes backoff and starts CCA operation 640. Later at time $T_5$, 802.11ah device 610 starts its backoff procedure 630. At time $T_6$, CCA of 802.15.4g device 620 reports idle channel 650 and therefore, 802.15.4g device 620 starts CCA to TX turnaround process 660, during which time period 802.11ah device 610 completes its backoff process at time $T_7$ and channel is still idle. So, 802.11ah device 610 starts its data transmission 670. The problem is that once finishing CCA to TX turnaround at time $T_8$, 802.15.4g device 620 does not know 802.11ah device 610 already started transmission. Thus, 802.15.4g device 620 starts its data transmission 670. 802.11ah device 610 completes its data transmission at time $T_9$. As a result, data collision 675 occurs from time $T_8$ to time $T_9$. This collision occurs because 802.15.4g CCA time plus CCA to TX turnaround time is 320 µs, which is long enough for 802.11ah device 610 to complete its 6 or less backoff time slots and starts its data transmission.

Figure 6B:
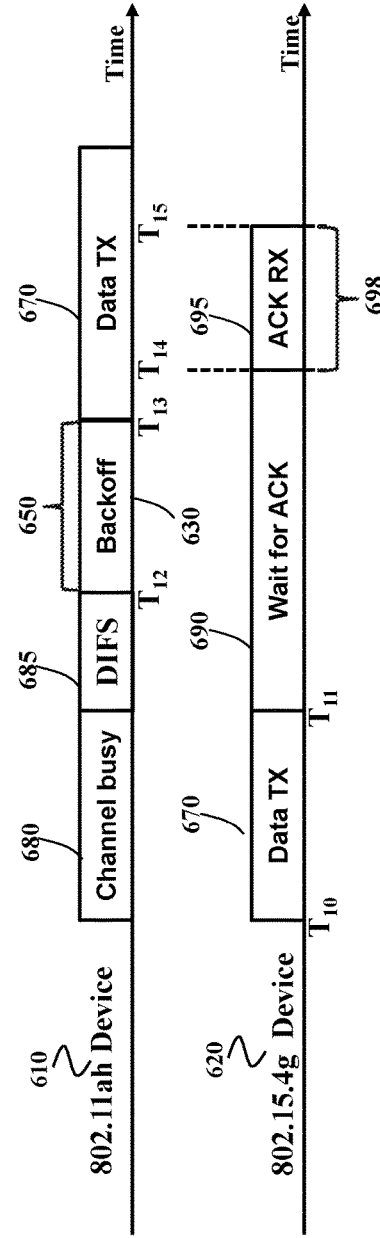
FIG. 6B shows an example of 802.11ah device transmission interfering with 802.15.4g acknowledgement packet receiving due to faster backoff mechanism of 802.11ah.

In Wi-Fi HaLow and Wi-SUN network, a unicast packet needs to be acknowledged by the recipient to confirm successful packet delivery. A Wi-SUN source node can wait a long time to receive the acknowledgement (ACK) packet from the recipient. This long ACK waiting period gives a Wi-Fi HaLow device enough time to complete its backoff and start packet transmission, which can interfere with Wi-SUN ACK packet receiving. FIG. 6B shows an example, in which 802.11ah transmission interferes with 802.15.4g ACK receiving (RX) if 802.11ah backoff takes 24 or less time slots. At time $T_{10}$, an 802.15.4g device 620 starts data transmission 670. So, an 802.11ah device 610 detects channel is busy 680 and it monitors channel status in each time slot. At time $T_{11}$, the 802.15.4g device 620 completes its data transmission and starts waiting for ACK packet 690. Since channel becomes idle at time $T_{11}$, the 802.11ah device 610 waits for DIFS time period 685 and starts its backoff process 630 at time $T_{12}$. At time $T_{13}$, the 802.11ah device 610 completes its backoff process 630 and CCA of the 802.11ah device 610 reports idle channel 650. Therefore, the 802.11ah device 610 starts data transmission 670. Because data recipient of the 802.15.4g device 620 does not perform CCA from data receiving to ACK sending, 802.15.4g ACK packet transmission starts at time $T_{14}$ and ends at time $T_{15}$, during which time period the 802.11ah device 610 is transmitting its data packet. So, data packet transmission of the 802.11ah device 610 collides with 695 ACK receiving (RX) of the 802.15.4g device 620. This ACK collision occurs because 802.15.4g ACK waiting time is 1280 µs, which is long enough for the 802.11ah device 610 to complete its 24 or less backoff time slots and starts its data transmission.

Data collision and ACK collision are caused by faster backoff process of the 802.11ah device. In this case, the 802.11ah device does not violate any protocol, but it is unable to detect ongoing 802.15.4g transmission process. Therefore, further method must be provided for the 802.11ah device to reduce collision with 802.15.4g data and ACK transmissions.

According to embodiments of the present invention, it is possible to reduce the interference by managing the backoff process of the 802.11ah device.

Coexistence Control for the Co-Located 802.11ah Network and 802.15.4g Network

According to embodiments of the present disclosure, a coexistence control can be performed at the 802.11ah network or the 802.15.4g network or at both 802.11ah and 802.15.4g networks. An embodiment of the present disclosure provides the coexistence control method and program for the 802.11ah networks since the 802.15.4g devices may already been deployed and the 802.11ah will be deployed.

According to embodiments of the present disclosure, the interference is reduced by enhancing the 802.11ah ED-CCA mechanism via α-fairness technique. In this case, the 802.11ah devices are configured to detect more 802.15.4g packet transmissions.

According to another embodiment of the present disclosure, the interference is reduced based on a Q-Learning approach, in which the 802.11ah devices are configured to determine the possibility of ongoing 802.15.4g transmissions.

α-Fairness Based ED-CCA (α-Fair ED-CCA) Control Method

According to embodiments of the present disclosure, an α-fair ED-CCA control method, which can be used to reduce the interference of the 802.11ah network with the 802.15.4g network, is described in the following. The α-fair ED-CCA control method can be provided as an α-fair ED-CCA control program 233 in the storage device 230.

Further, the ED CCA control method determines an α-fair ED threshold between a receiver sensitivity (RS) of the Wi-SUN protocol and an energy-detection (ED) threshold of the Wi-Fi HaLow protocol, wherein the ED CCA control method permits the transmission when the detected energy level of the wireless signal is less than the α-fair ED threshold.

The ED-CCA method (process) is performed by an 802.11ah device if it has packet to transmit. The energy detected by the 802.11ah ED-CCA may come from an 802.15.4g network or other S1G networks. If the detected energy level is in a range 540 or a range 570 in FIG. 5, the 802.11ah coexistence mechanism can handle the case without requiring any further control. However, if the detected energy level falls in range 580, the 802.11ah coexistence mechanism ignores the detected energy. There are two possibilities for the detected energy source:

1) The energy comes from 802.15.4g packet transmission. In this case, 802.11ah ED-CCA should report busy channel.
2) 2) The energy comes from other S1G networks. In this case, 802.11ah ED-CCA should report idle channel.

The challenge is that the 802.11ah device does not know the source of the detected energy.

a) What if 802.11ah ED-CCA always reports idle channel as standard says? Clearly, this approach is in favor of the 802.11ah network. It gives the 802.11ah network more channel access opportunity to transmit more packets. However, the transmission of an 802.11ah packet may collide with lower power 802.15.4g packet transmission.
b) Then what if 802.11ah ED-CCA always reports busy channel? This approach is in favor of the 802.15.4g network. It enables the 802.15.4g packet with lower transmission power to be transmitted without interference. But, it is not spectrum efficient because if the detected energy comes from non-802.15.4g packet transmission, the transmission should be ignored and the 802.11ah device should continue its transmission process.

An embodiment of the present disclosure provides an α-fairness based ED-CCA (α-fair ED-CCA) control method to consider the fairness tradeoff between 802.11ah network and 802.15.4g network. With the provided control method, the 802.11ah α-fair ED-CCA reports channel status based on a probability determined by the α-fairness technique. To do so, define following generalized α-fairness utility objective function:

$$V(P_1, P_2) = \frac{1}{1-\alpha}\left[P_1^{1-\alpha}\frac{U_1^{1-\alpha}}{U_1^{1-\alpha}+U_2^{1-\alpha}} + P_2^{1-\alpha}\frac{U_2^{1-\alpha}}{U_1^{1-\alpha}+U_2^{1-\alpha}}\right]$$

$$Pi \geq 0, \quad i = 1, 2, \alpha > 0, \quad \alpha \neq 1$$

where $P_1$ is the probability of 802.11ah α-fair ED-CCA reports idle channel, $P_2$ is the probability of 802.11ah α-fair ED-CCA reports busy channel, α is the parameter to control fair channel access allocation between 802.11ah network and 802.15.4g network, $U_1$ and $U_2$ are the network utilities of 802.11ah network and 802.15.4g network, respectively. The network utility could be metrics such as data packet receiving rate, data packet transmission rate, channel utilization and the data packet delay.

The α-fair spectrum sharing corresponds to the maximization of object function V ($P_1$, $P_2$) subject to condition $P_1+P_2=1$. Because function $x^{1-\alpha}$ is concave, this optimization problem has unique solution given by $$P_1^* = \frac{1}{1+\left(\frac{U_1}{U_2}\right)^{\frac{\alpha-1}{\alpha}}} \text{ and } P_2^* = \frac{1}{1+\left(\frac{U_1}{U_2}\right)^{\frac{1-\alpha}{\alpha}}} \quad (1)$$

Equation (1) shows that for α>1, more channel access opportunity is granted to the network with smaller utility and for α<1, more channel access opportunity is given to the network with larger utility. For example, if α>1 and $U_1$ and $U_2$ are packet receiving rates, more transmission opportunity will be given to 802.15.4g network since $U_1$>$U_2$. If $U_1/U_2$ approaches 1, it tends to give equal channel access opportunity to 802.11ah network and 802.15.4g network.

Figure 7:
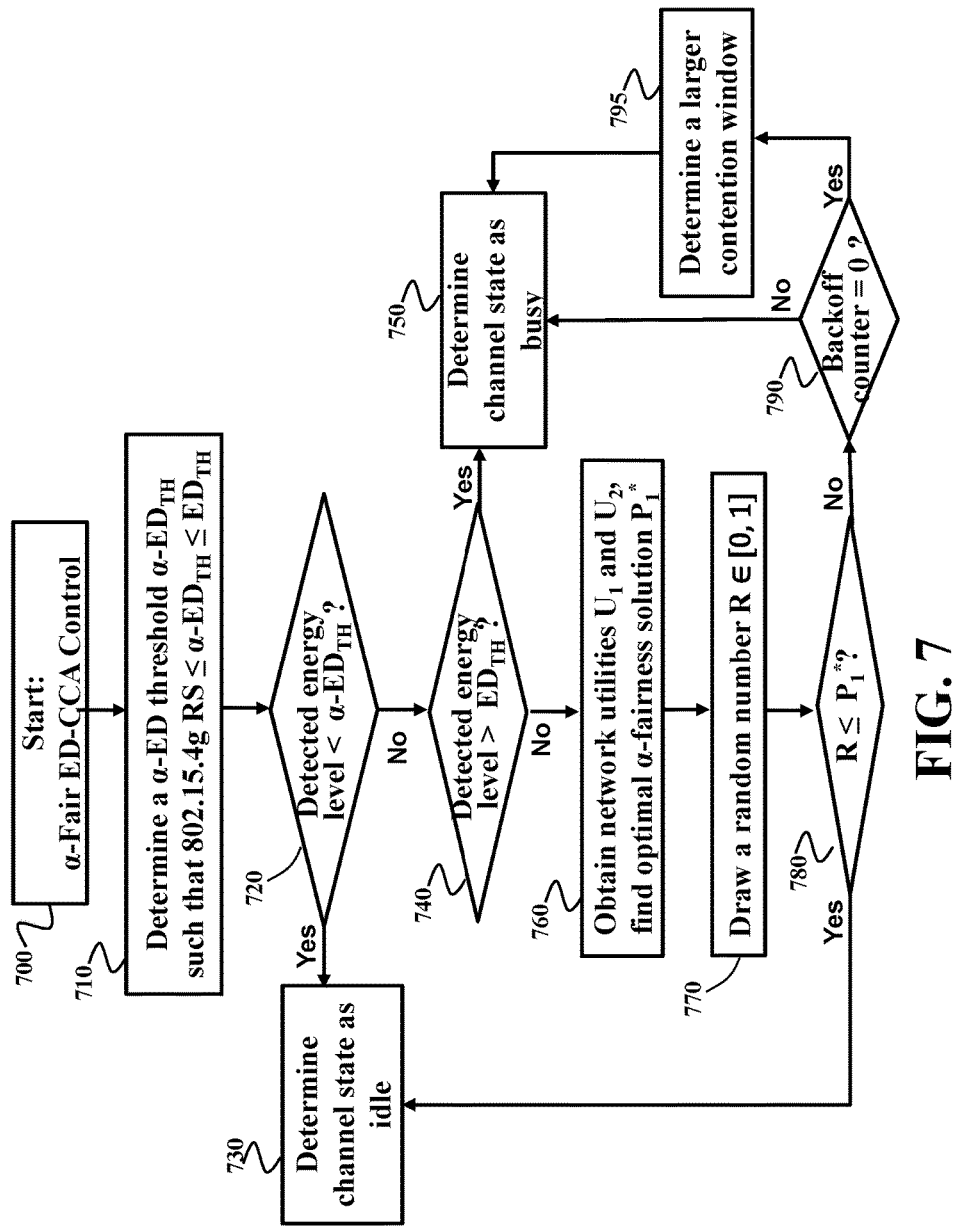
FIG. 7 is a block diagram of α-fairness based energy detection clear channel assessment (α-fair ED-CCA) according to embodiments of the invention.

FIG. 7 is a flowchart illustrating an algorithm of an α-fair ED-CCA control method for 802.11ah devices. In this case, the $ED_{TH}$ indicates an energy detection (ED) threshold defined by the 802.11ah standard. The algorithm of the α-fair ED-CCA control method can be stored in computer readable storage 130.

Depending on channel width, the $ED_{TH}$ can be −75 dBm or −72 dBm or −69 dBm or −66 dBm. The 802.15.4g ED threshold is in [−110 dBm, −78 dBm] and the 802.15.4g receiver sensitivity (RS) is typically 10 dB below the 802.15.4g ED threshold. To perform the α-fair ED-CCA method 700, an 802.11ah device first determines an α-fairness based ED threshold (first threshold) α-$ED_{TH}$, such that 802.15.4g RS≤α-$ED_{TH}$≤$ED_{TH}$ in step 710. If the detected energy level <α-$ED_{TH}$ in step 720, the α-fair ED-CCA recognizes a channel status of the 802.15.4g as an idle state in step 730, allowing packet transmissions. Otherwise, the α-fair ED-CCA checks if the detected energy level >$ED_{TH}$ in step 740. If yes, α-fair ED-CCA reports channel status as busy in step 750. If no, the α-fair ED-CCA obtains network utilities $U_1$ and $U_2$, and computes optimal α-fairness solution $P_1^*$ in step 760. The α-fair ED-CCA then draws a uniform random number R∈[0, 1]. If R≤$P_1^*$ in step 770, α-fair ED-CCA reports channel status as idle in step 730, which allows packet transmissions of the 802.11ah device. Otherwise, α-fair ED-CCA checks the value of backoff counter in step 790. If the backoff counter >0, α-fair ED-CCA reports channel status as busy in step 750. Otherwise, if the backoff counter=0, α-fair ED-CCA determines a larger value of contention window in step 795 and then reports channel status as busy in step 750.

If the backoff counter=0, i.e., at last backoff slot, if α-fair ED-CCA reports busy channel, it indicates that an 802.15.4g transmission is in progress. To avoid colliding with 802.15.4g transmission, especially ACK transmission, a larger contention window can be applied instead of using standard exponential contention window increase since 802.15.4g ACK waiting time can be very long, e.g., for 20 ksymbol/s symbol rate, it is 1600 μs, which is greater than 30 802.11ah time slots. 802.15.4g ACK packet can be transmitted at any time during 1600 μs period. Therefore, 802.11ah devices should not transmit any packet during this time period.

The backoff counter represents number of backoff time slots to be assessed as idle by CCA mechanism, e.g., backoff counter=2 means two more time slots must be determined as idle before a transmission takes place.

Depending on the value of the determined α-fair ED threshold α-$ED_{TH}$, α-fair ED-CCA control can be applied in any portion of energy range 580, e.g., if α-$ED_{TH}$=802.15.4g RS, α-fair ED-CCA is applied in entire range 580, if α-$ED_{TH}$=802.15.4g ED threshold, α-fair ED-CCA is applied in range 560 only and if α-$ED_{TH}$=$ED_{TH}$, α-fair ED-CCA control does not apply. This shows the flexibility of the provided α-fair ED-CCA control method.

Similar to the case of the 802.15.4g network, the α-fair ED-CCA control method described above can be applied to other general IEEE 802.15.4 standard devices or networks, since the mechanism of the 802.11ah device transmission interference with the low-rate wireless personal area network devices are similar to that of the 802.15.4g network.

Q-Learning Based Backoff Control Method

According to embodiments of the present disclosure, a Q-Learning based backoff control method, which can be used to reduce the interference of the 802.11ah network with the 802.15.4g network, is described below. Q-Learning based backoff control method can be provided as a Q-Learning control program 232 in the storage device 230.

As illustrated in FIG. 6A and FIG. 6B, when the 802.11ah backoff counter reaches to zero, even ED-CCA reports idle channel, there might be an 802.15.4g transmission still in progress. As the 802.11ah device does not recognize if the 802.15.4g transmission is in progress or not, the 802.11ah device can perform either transmission or backoff.

As a practical control strategy under stochastic environment, a Q-Learning based backoff control method is proposed for 802.11ah devices to make decision by learning the optimal strategy. The Q-Learning based backoff control method may be referred to as a Q-Learning method. The Q-Learning method can be performed by the processor 220 executing a Q-Learning control program 232 stored in the storage 230 or a memory installed in the Wi-Fi HaLow module 214. The algorithm of the Q-Learning control program 232 will be described below and illustrated as a flowchart in FIG. 8.

In some cases, the Wi-Fi HaLow transmitter/receiver module 214 may include a processor and a memory (not shown) storing the Q-Learning control program 232 to perform the Q-Learning method.

The Q-Learning method is one of machine learning techniques to learn the optimal action selection policy from the operation history to maximize the accumulated reward. For a frequency spectrum (band) sharing between an 802.11ah network and an 802.15.4g network, the Q-Learning method is used to learn a binary strategy on the fly at last backoff slot. To do so, the Q-Learning method defines a state set S={$s_1$, $s_2$}={Channel Idle, Channel Busy} and an action set A={$a_1$, $a_2$}={Transmit, Backoff}. The following Q-Learning objective function is invoked to use:

$$Q_{t+1}(s, a) = (1 - \tau_t)Q_t(s, a) + \tau_t(R_t(s, a) + \gamma \Phi_t(s', b))$$

$$\Phi_t(s', b) = \max_{b \in B(s')} Q_t(s', b)$$

where $Q_t$(s, a) is Q-Learning objective function, $\tau_t$ is a learning rate (0<$\tau_t$<1), γ is a discount factor (0<γ<1), $R_t$(s, a) is a reward obtained by performing action a at state s at time t, s' is the state that can be reached from state s when performing action a, B(s') is action set that can be taken at state s'. By taking action b, the maximum value of objective function is obtained as $\Phi_t$(s', b).

$R_t$(s, a) can be fixed or variable. The central idea of Q-Learning is to design proper rewards for each {state, action} pair so that the accumulated reward is maximized. For frequency spectrum sharing, α-fairness based rewards are defined as follows:

$$R_t(s, a) = \begin{cases} \frac{1}{|V_t^1 - E[V^*]| + 1} & \text{(Idle, Transmit)} \\ \frac{1}{|V_t^2 - E[V^*]| + 1} & \text{(Idle, Backoff)} \\ -1 & \text{(Busy, Transmit)} \\ 0 & \text{(Busy, Backoff)} \end{cases} \quad (2)$$

where V*=V ($P_1$*, $P_2$*) is the maximum expected utility at time t, E[V*] represents expectation value of V* over time and can be linearly calculated as $$E[V^*] = \frac{(t-1)E[V^*(t-1)] + V^*(t)}{t}.$$

$V_t^1$ is obtained when 802.11ah is granted channel access, i.e., $P_1$=1 and $P_2$=0. $V_t^2$ is obtained when 802.11ah is not granted channel access, i.e., $P_1$=0 and $P_2$=1. The principle to use instant rewards is to make decision closely based on α-fair spectrum allocation. If the absolute error between the ideal α-fair expected utility and the utility obtained after performing an action a is small, the action a tends to be chosen since its cumulated reward gives larger Φ. In addition, it definitely causes interference to transmit packet when channel is already busy. Thus, the negative reward is assigned to {Channel Busy, Transmit} pair to punish the behavior. If channel is busy, backoff is a right action to take. So, zero reward is assigned to {Channel Idle, Backoff} pair.

It is necessary to point out that in α-fairness object function V ($P_1$, $P_2$), $P_1$ is now the probability of granting channel access to the 802.11ah network and $P_2$ is now the probability of not granting channel access to the 802.11ah network.

Figure 8:
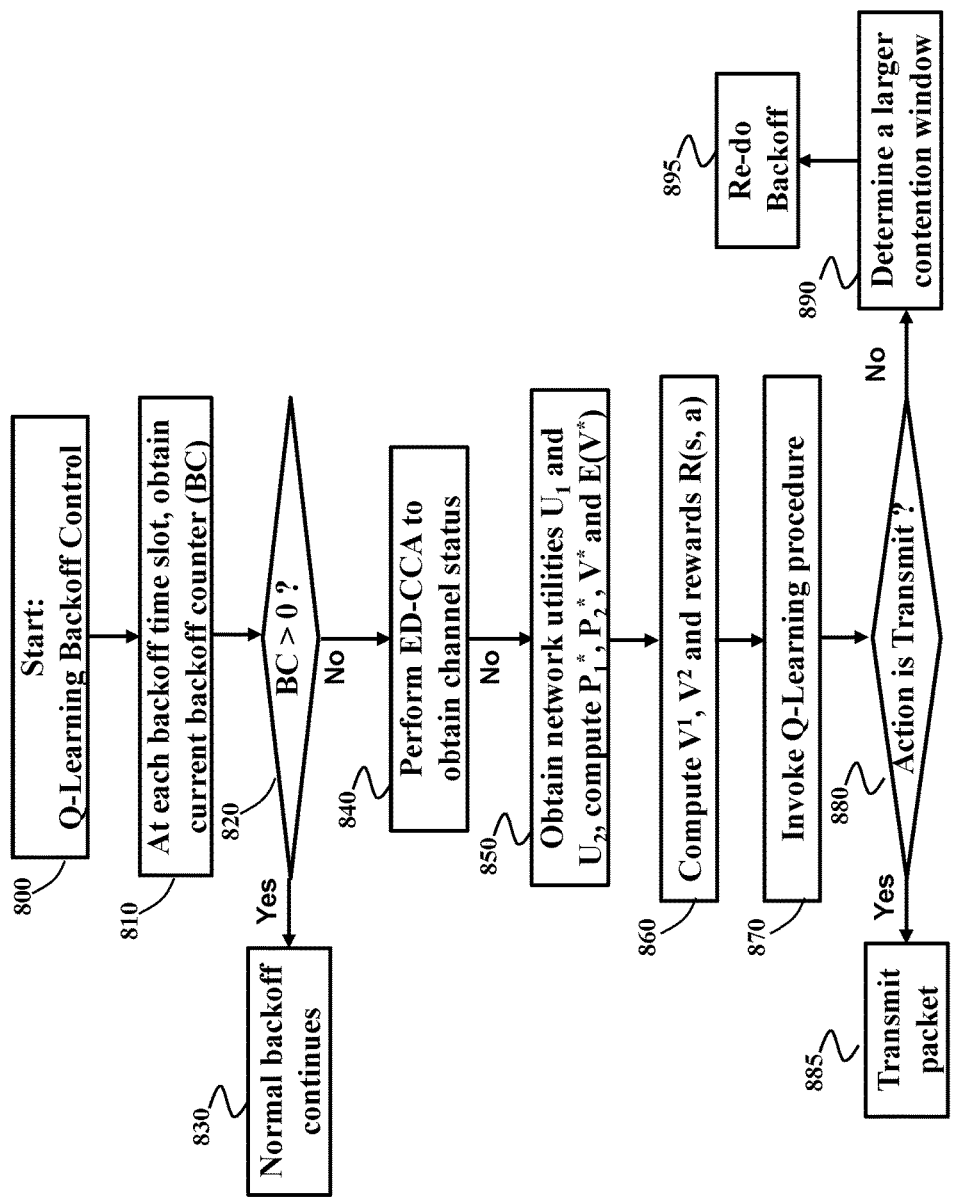
FIG. 8 is a block diagram of a Q-Learning based backoff method according to one embodiments of the invention.

FIG. 8 describes a flow chart describing the Q-Learning backoff control method performing a Q-Learning backoff control process for 802.11ah network. The 802.11ah device starts performing the Q-Learning backoff control process in step 800. The 802.11ah device obtains the value of backoff counter (BC) from the memory at each backoff time slot 810, since Backoff counter is a parameter maintained by each 802.11ah device, and each device has its own backoff counter value in the memory. If 820 backoff counter 0>0, normal backoff procedure continues in step 830. In some cases, an additional determination step of the backoff procedure may be added after step 820. In this case, even if the backoff counter indicate zero and the α-fair ED-CCA process or the ED-CCA reports channel status as idle in step 840, as indicated in the figure, the backoff procedure is continued. When the α-fair ED-CCA control program 233 is not included in the storage 230 according to some system designs, the standard ED-CCA is used. The Q-Learning backoff control process obtains network utilities $U_1$ and $U_2$ and computes $P_1^*$, $P_2^*$, $V^*$ and $E[V^*]$ in step 850. The Q-Learning backoff control process then computes $V^1$, $V^2$ and rewards $R(s, a)$ in step 860. Once these parameters are ready, the Q-Learning backoff control process invokes the Q-Learning procedure to determine optimal action in step 870. When the action indicates Transmit, the 802.11ah device transmits a packet in step 885. If the action indicates Backoff, the Q-Learning backoff control process determines a larger contention window in step 890 and re-perform backoff in step 895.

The Q-Learning backoff control process is used to make an action selection when the backoff counter reaches to zero (and α-fair ED-CCA or ED-CCA reports channel status as idle if the storage 230 includes the α-fair ED-CCA control program 233). In this case, the 802.11ah device treats (determines) channel as idle, but a lower power 802.15.4g packet transmission might be in progress or the 802.15.4g device is waiting for an ACK packet. The Q-Learning backoff control process determines an optimal action for the 802.11ah device to take. If the optimal action is indicated as Backoff because of potential collision or α-fair spectrum allocation to 802.15.4g, the 802.11ah device transmission process returns to backoff again. Otherwise, the 802.11ah device transmits a packet.

Further, when the optimal action is indicated as Backoff, it implies that an 802.15.4g transmission might be in progress. To avoid interference, a larger contention window can be applied in step 890 instead of using standard exponential contention window increase.

The α-fair ED-CCA control process and Q-Learning backoff control process may be applied separately or together. In addition, different network utilities can be used for different coexistence control methods. The provided coexistence control methods are designed in distributed fashion. Each 802.11ah device runs the control process independently. Acquisition of the network utilities is implementation dependent. For example, the 802.11ah AP can compute packet receiving rate for the 802.11ah network, obtains an 802.15.4g packet receiving rate through a gateway and broadcast network utilities to the 802.11ah devices. An 802.11ah device can sense metrics such as 802.15.4g channel utilization via the energy detection.

Similar to the case of the 802.15.4g network, the Q-Learning backoff control method described above can be applied to other general IEEE 802.15.4 standard devices or networks, since the mechanism of the 802.11ah device transmission interference with the low-rate wireless personal area network devices are similar to that of the 802.15.4g network.

Simulation Results of Data Packet Delivery Rate

Figure 9:
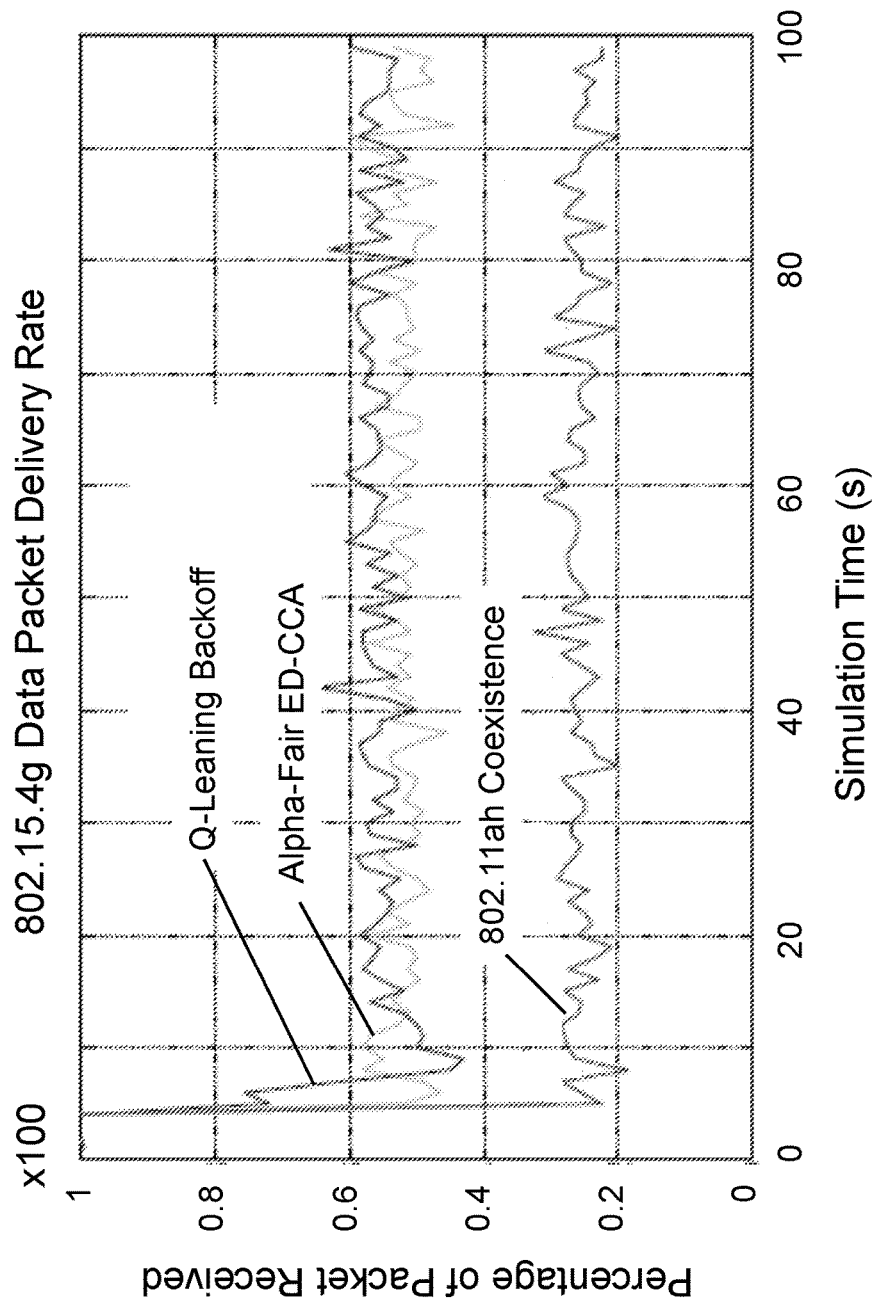
FIG. 9 shows simulation results indicating the data packet delivery rates with respect to the Q-Learning Backoff method and the Alpha-Fair ED-CCA method, according to embodiments of the present disclosure.

FIG. 9 shows simulation results indicating the data packet delivery rate (PDR) of 802.15.4g network with respect to the Q-Learning Backoff method and the Alpha-Fair ED-CCA method, according to embodiments of the present disclosure. The simulation results are compared with 802.11ah coexistence method. It is seen that both methods respectively improve 802.15.4g PDR by 26% and 29% compared to 802.11ah coexistence case.

Further, embodiments according to the present disclosure provide effective method for performing wireless communications between 802.11ah network devices, thus, the use of a method and device using the Q-Learning Backoff control program 232 and/or the α-fair ED-CCA control program 233 can reduce central processing unit (CPU) usage, power consumption and/or network band width usage.

Figure 10:
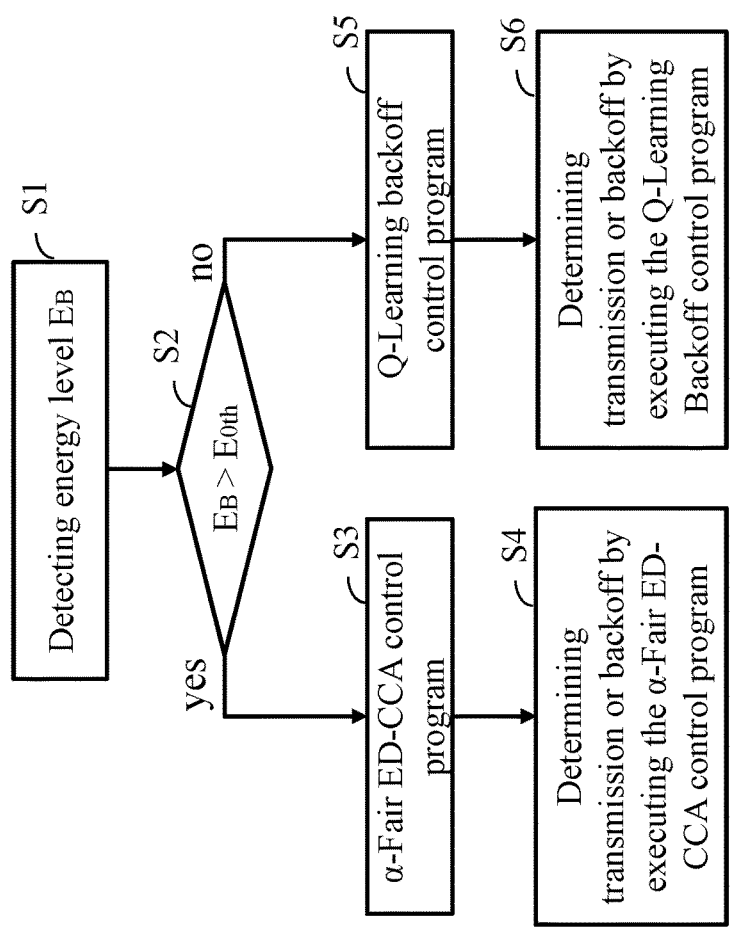
FIG. 10 shows a flowchart illustrating a method for selecting an α-Fair ED-CCA control process or a Q-Learning backoff control process based on energy level detection of a wireless signal, according to embodiments of the present disclosure.

FIG. 10 shows a flowchart of a program selecting method for selecting an α-Fair ED-CCA control process (program) or a Q-Learning backoff control process (program) based on energy level detection of a wireless signal, according to embodiments of the present disclosure. The program selecting method may be stored in the storage device 230 or one or mere memories 240 as a selection program (not shown) executable by the processor 220. The selection program may be initiated when the 802.11ah network system 200 receives wireless signals of packets of the 802.11ah network devices or the 802.15.4g network devices.

As discussed above, the α-Fair ED-CCA control process and the Q-Learning backoff control process can be applied in the 802.11ah network system 200 to mitigate the interference with respect to the 802.11ah network and the 802.15.4g network. Each of the α-Fair ED-CCA control program and the Q-Learning backoff control program can be used in the 802.11ah network system 200 independently. When the 802.11ah network system 200 includes the α-Fair ED-CCA control program and the Q-Learning backoff control program in the storage device 230, one of the α-Fair ED-CCA control program and the Q-Learning backoff control program may be selected for mitigating influences of the 802.11ah network for the 802.15.4g network.

For instance, either the α-Fair ED-CCA control program 233 or the Q-Learning backoff control program 232 can be selected based on an energy level of packets transmitted from the 802.11ah network devices or the 802.15.4g network devices using a selection program stored in the storage device 230.

FIG. 10 shows that the 802.11ah network system 200 detects an energy level $E_B$ of wireless signals of packets by a sensor in the system 200 via the antenna in step S1, and selects the α-Fair ED-CCA control program 233 in step S2 if the energy level $E_B$ is greater than a threshold $E_{Oth}$, and executes the α-Fair ED-CCA control program 233. The threshold $E_{Oth}$ may be referred to as a selection threshold. According to an execution result of the α-Fair ED-CCA control program 233 illustrated as the flowchart in FIG. 7, the 802.11ah network system 200 determines an operation of a packet transmission or a backoff process in step S4.

If the energy level $E_B$ is equal to or smaller than the threshold $E_{Oth}$, then the 802.11ah network system 200 selects the Q-Learning backoff control program 232 in step S2 and executes the Q-Learning backoff control program in step S5. According to an execution result of the Q-Learning backoff control program 232 illustrated as the flowchart in FIG. 8, the 802.11ah network system 200 determines an operation of a packet transmission or a backoff process in step S6. For instance, in a selecting step of the α-Fair ED-CCA control program 233 or the Q-Learning backoff control program 232 in S2, the threshold $E_{Oth}$ may be set to an energy level of approximately −85 dBm.

In some embodiments according to the present disclosure, the 802.11ah network system 200 may be a gateway device by connecting to an access point (AP) device of the 802.11ah network and the personal area network coordinator (PANC) of the 802.15.4g network using cable connections (not shown). For instance, when the execution result of the α-Fair ED-CCA control program 233 or the Q-Learning backoff control program 232 indicates a backoff process, the gateway device can transmit a command message to 802.11ah network devices assigned to the AP device so that the 802.11ah network devices perform a backoff process and the 802.15.4g devices can transmit a packet to communicate with other 802.15.4g devices.

In another embodiment according to the present disclosure, the 802.11ah network system 200 may be an 802.11ah adaptor attachable to a preexisting 802.11ah device and the AP device that has already been deployed in the 802.11ah network coexisting with the 802.15.4g network. By attaching the 802.11ah adaptor to the preexisting 802.11ah device, the 802.11ah adaptor causes the preexisting 802.11ah device to perform a backoff process when the execution result of the α-Fair ED-CCA control program 233 or the Q-Learning backoff control program 232 indicates a backoff process.

Further, in some embodiments according to the present disclosure, a non-transitory computer-readable medium storing software for coexistence of a Wi-Fi HaLow network and a Wi-SUN network can be installed into memories or storages in existing Wi-Fi HaLow networks or existing Wi-Fi HaLow network devices to perform the α-Fair ED-CCA control program 233 or the Q-Learning backoff control program 232. The software comprises instructions executable by one or more computers which, upon such execution, cause the one or more computers to perform operations that comprise steps of receiving a wireless signal of a frequency band shared with the Wi-SUN network using a Wi-SUN protocol, detecting an energy level of the wireless signal; storing a first program for performing an energy-detection (ED) clear channel assignment (CCA) control process, executing the first program to determine if a transmission of a packet is permitted based on the detected energy level of the wireless signal according to the ED CCA control process, and transmitting the packet over the frequency band according to the Wi-Fi HaLow protocol when the ED CCA control process has permitted the transmission. In this case, the ED CCA control process determines an α-fair ED threshold between a receiver sensitivity (RS) of the Wi-SUN protocol and an energy-detection (ED) threshold of the Wi-Fi HaLow protocol, wherein the ED CCA control process permits the transmission when the detected energy level of the wireless signal is less than the α-fair ED threshold. Further, the ED CCA control process does not permit the transmission when the detected energy level of the wireless signal is greater than the ED threshold. In some cases, when the detected energy level of the wireless signal is greater than the α-fair ED threshold but less than the ED threshold, the ED CCA control process determines if the transmission is permitted according to a computation result of an optimal α-fairness solution of a predetermined object function.

For instance, when a Wi-Fi HaLow network is arranged to co-located with a Wi-SUN network, a network system for coexistence of a Wi-Fi HaLow network and a Wi-SUN network includes a receiver for receiving a wireless signal of a frequency band shared with the Wi-SUN network using a Wi-SUN protocol, a sensor for detecting an energy level of the wireless signal, a memory storing a first program for performing an energy-detection (ED) clear channel assignment (CCA) control process, a processor, in connection with the sensor and the memory, for executing the first program to determine if a transmission of a packet is permitted based on the detected energy level of the wireless signal according to the ED CCA control process, and a transmitter for transmitting the packet over the frequency band according to the Wi-Fi HaLow protocol when the ED CCA control process has permitted the transmission.

In this case, the ED CCA control process may determine an α-fair ED threshold between a receiver sensitivity (RS) of the Wi-SUN protocol and an energy-detection (ED) threshold of the Wi-Fi HaLow protocol, wherein the ED CCA control process permits the transmission when the detected energy level of the wireless signal is less than the α-fair ED threshold.

Further, the ED CCA control process does not permit the transmission when the detected energy level of the wireless signal is greater than the ED threshold.

In some cases, when the detected energy level of the wireless signal is greater than the α-fair ED threshold but less than the ED threshold, the ED CCA control process determines if the transmission is permitted according to a computation result of an optimal α-fairness solution of a predetermined object function.

In such a case, the predetermined objective function is expressed by $$V(P_1, P_2) = \frac{1}{1-\alpha}\left[P_1^{1-\alpha}\frac{U_1^{1-\alpha}}{U_1^{1-\alpha}+U_2^{1-\alpha}} + P_2^{1-\alpha}\frac{U_2^{1-\alpha}}{U_1^{1-\alpha}+U_2^{1-\alpha}}\right]$$

$$Pi \geq 0, \quad i=1,2, \alpha > 0, \quad \alpha \neq 1$$

wherein $P_1+P_2=1$, $P_1$ is a permissible probability of the transmission, $P_2$ is an impermissible probability of the transmission, α is a parameter to control fair channel access allocation between the Wi-Fi HaLow network and the Wi-SUN network, $U_1$ and $U_2$ are network utilities of the Wi-Fi HaLow network and the Wi-SUN network, respectively.

The network system above may further include a Wi-SUN transmitter/receiver module to transmit an available information packet to a personal area network coordinator (PANC) of the Wi-SUN network according to the Wi-SUN protocol when the processor determines that the transmission is not permitted after executing the first program.

In that case, the memory includes a second program that causes the processor to perform a Q-Learning backoff control process for determining if the transmission is permitted based on a computation result of a Q-Learning objective function. Further, the memory stores a selection threshold for selecting the first program or the second program based on the detected energy level of the wireless signal.

The processor performs the Q-Learning backoff control process when the detected energy level of the wireless signal is equal to or less than the selection threshold.

The network system may also include a first input/output interface connectable to an access point of the Wi-Fi HaLow network via a first wire cable. The network system may include a second input/output interface connectable to a personal area network coordinator (PANC) of the Wi-SUN network via a second wire cable.

By selecting or combining the elements included in the system above, a network device for coexistence of a Wi-Fi HaLow network and a Wi-SUN network can be provided. In this case, the network device includes a receiver for receiving a wireless signal of a frequency band shared with the Wi-SUN network using a Wi-SUN protocol; a memory for storing a Q-Learning backoff control program for performing a backoff control process; a processor, in connection with the memory, for executing the Q-Learning backoff control program to determine if a transmission of a packet is permitted; and a transmitter for transmitting the packet over the wireless channel according to a Wi-Fi HaLow protocol when the backoff control process permits the transmission. In this case, the Q-Learning backoff control program causes the processor to calculate a Q-Learning objective function, wherein the Q-Learning objective function is expressed by $$Q_{t+1}(s, a) = (1 - \tau_t)Q_t(s, a) + \tau_t(R_t(s, a) + \gamma\Phi_t(s', b))$$

$$\Phi_t(s', b) = \max_{b \in B(s')} Q_t(s', b)$$

where $Q_t(s, a)$ is Q-Learning objective function, $\tau_t$ is a learning rate ($0 < \tau_t < 1$), $\gamma$ is a discount factor ($0 < \gamma < 1$), $R_t(s, a)$ is a reward obtained by performing action a at state s at time t, s' is the state that can be reached from state s when performing action a, B(s') is action set that can be taken at state s'.

The processes used in the system above may be stored into a non-transitory computer-readable medium storing software for coexistence of a Wi-Fi HaLow network and a Wi-SUN network. The software includes instructions executable by one or more computers which, upon such execution, cause the one or more computers to perform operations comprising: receiving a wireless signal of a frequency band shared with the Wi-SUN network using a Wi-SUN protocol; detecting an energy level of the wireless signal; storing a first program for performing an energy-detection (ED) clear channel assignment (CCA) control process; executing the first program to determine if a transmission of a packet is permitted based on the detected energy level of the wireless signal according to the ED CCA control process; and transmitting the packet over the frequency band according to the Wi-Fi HaLow protocol when the ED CCA control process has permitted the transmission. In this case, the ED CCA control process determines an α-fair ED threshold between a receiver sensitivity (RS) of the Wi-SUN protocol and an energy-detection (ED) threshold of the Wi-Fi HaLow protocol, wherein the ED CCA control process permits the transmission when the detected energy level of the wireless signal is less than the α-fair ED threshold. Further, the ED CCA control process does not permit the transmission when the detected energy level of the wireless signal is greater than the ED threshold.

Yet in another case, when the detected energy level of the wireless signal is greater than the α-fair ED threshold but less than the ED threshold, the ED CCA control process determines if the transmission is permitted according to a computation result of an optimal α-fairness solution of a predetermined object function, wherein the predetermined objective function is expressed by $$V(P_1, P_2) = \frac{1}{1-\alpha}\left[P_1^{1-\alpha}\frac{U_1^{1-\alpha}}{U_1^{1-\alpha} + U_2^{1-\alpha}} + P_2^{1-\alpha}\frac{U_2^{1-\alpha}}{U_1^{1-\alpha} + U_2^{1-\alpha}}\right]$$

$$P_i \geq 0, \quad i = 1, 2, \alpha > 0, \quad \alpha \neq 1$$

wherein $P_1 + P_2 = 1$, $P_1$ is a permissible probability of the transmission, $P_2$ is an impermissible probability of the transmission, α is a parameter to control fair channel access allocation between the Wi-Fi HaLow network and the Wi-SUN network, $U_1$ and $U_2$ are network utilities of the Wi-Fi HaLow network and the Wi-SUN network, respectively.

The non-transitory computer-readable medium may further comprise storing a second program that causes the one or more computers to perform a Q-Learning backoff control process for determining if the transmission is permitted based on a computation result of a Q-Learning objective function. Further, the instructions may comprise storing a selection threshold for selecting the first program or the second program based on the detected energy level of the wireless signal.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A network system for coexistence of a Wi-Fi HaLow network and a low-rate wireless personal area network (LR-WPAN), comprising:
    a receiver for receiving a wireless signal over a frequency band shared with the LR-WPAN using an LR-WPAN protocol;
    a detector for detecting an energy level of the wireless signal;
    a memory storing a first program for performing an energy-detection (ED) clear channel assignment (CCA) control process;
    a processor, in connection with the detector and the memory, for executing the first program to determine when a transmission of a packet is permitted based on the detected energy level of the wireless signal according to the ED CCA control process; and
    a transmitter for transmitting the packet over the frequency band according to a Wi-Fi HaLow protocol when the ED CCA control process has permitted the transmission.

2. The network system of claim 1, wherein the ED CCA control process determines an alpha-fair (α-fair) ED threshold between a receiver sensitivity (RS) of an LR-WPAN protocol and an energy-detection (ED) threshold of the Wi-Fi HaLow protocol, wherein the ED CCA control process permits the transmission when the detected energy level of the wireless signal is less than the α-fair ED threshold.

3. The network system of claim 2, wherein the ED CCA control process does not permit the transmission when the detected energy level of the wireless signal is greater than the ED threshold.

4. The network system of claim 3, wherein when the detected energy level of the wireless signal is greater than the α-fair ED threshold but less than the ED threshold, the ED CCA control process determines if the transmission is permitted according to a computation result of an optimal α-fairness solution of a predetermined object function.

5. The network system of claim 4, wherein the predetermined objective function is expressed by $$V(P_1, P_2) = \frac{1}{1-\alpha}\left[P_1^{1-\alpha}\frac{U_1^{1-\alpha}}{U_1^{1-\alpha}+U_2^{1-\alpha}} + P_2^{1-\alpha}\frac{U_2^{1-\alpha}}{U_1^{1-\alpha}+U_2^{1-\alpha}}\right]$$

$$Pi \geq 0, \quad i=1,2, \alpha > 0, \quad \alpha \neq 1$$

wherein $P_1+P_2=1$, $P_1$ is a permissible probability of the transmission, $P_2$ is an impermissible probability of the transmission, α is a parameter to control fair channel access allocation between the Wi-Fi HaLow network and the LR-WPAN, $U_1$ and $U_2$ are network utilities of the Wi-Fi HaLow network and the LR-WPAN, respectively.

6. The network system of claim 1, further comprising:
a wireless smart utility networks (Wi-SUN) transmitter/receiver module to transmit an available information packet to a personal area network coordinator (PANC) of the LR-WPAN according to the Wi-SUN protocol when the processor determines that the transmission is not permitted after executing the first program.

7. The network system of claim 1, wherein the memory includes a second program that causes the processor to perform a reinforcement learning (Q-Learning) backoff control process for determining when the transmission is permitted based on a computation result of a Q-Learning objective function.

8. The network system of claim 7, wherein the memory stores a selection threshold for selecting the first program or the second program based on the detected energy level of the wireless signal.

9. The network system of claim 8, wherein the processor performs the Q-Learning backoff control process when the detected energy level of the wireless signal is equal to or less than the selection threshold.

10. The network system of claim 1, further comprising:
a first input/output interface connectable to an access point of the Wi-Fi HaLow network via a first wire cable.

11. The network system of claim 1, further comprising:
a second input/output interface connectable to a personal area network coordinator (PANC) of the LR-WPAN via a second wire cable.

12. A network device for coexistence of a Wi-Fi HaLow network and a low-rate wireless personal area network (LR-WPAN), comprising:
a receiver for receiving a wireless signal of a frequency band shared with the LR-WPAN using a wireless smart utility networks (Wi-SUN) protocol;
a memory for storing a reinforcement learning (Q-Learning) backoff control program for performing a backoff control process;
a processor, in connection with the memory, for executing the Q-Learning backoff control program to determine when a transmission of a packet is permitted based on a computation result of a Q-Learning objective function; and
a transmitter for transmitting the packet over the wireless channel according to a Wi-Fi HaLow protocol when the backoff control process permits the transmission.

13. The network device of claim 12, wherein the Q-Learning backoff control program causes the processor to invoke a Q-Learning objective function, wherein the Q-Learning objective function is expressed by $$Q_{t+1}(s, a) = (1-\tau_t)Q_t(s, a) + \tau_t(R_t(s, a) + \gamma\Phi_t(s', b))$$

$$\Phi_t(s', b) = \max_{b \in B(s')} Q_t(s', b)$$

where $Q_t(s, a)$ is Q-Learning objective function, $\tau_t$ is a learning rate ($0<\tau_t<1$), γ is a discount factor ($0<\gamma<1$), $R_t(s, a)$ is a reward obtained by performing action a at state s at time t, s' is the state that can be reached from state s when performing action a, B(s') is action set that can be taken at state s'.

14. A non-transitory computer-readable medium storing software for coexistence of a Wi-Fi HaLow network and a low-rate wireless personal area network (LR-WPAN) comprising instructions executable by one or more computers which, upon such execution, cause the one or more computers to perform operations comprising:
receiving a wireless signal of a frequency band shared with the LR-WPAN using an LR-WPAN protocol;
detecting an energy level of the wireless signal;
storing a first program for performing an energy-detection (ED) clear channel assignment (CCA) control process;
executing the first program to determine when a transmission of a packet is permitted based on the detected energy level of the wireless signal according to the ED CCA control process; and
transmitting the packet over the frequency band according to the Wi-Fi HaLow protocol when the ED CCA control process has permitted the transmission.

15. The non-transitory computer-readable medium of claim 14, wherein the ED CCA control process determines an alpha-fair (α-fair) ED threshold between a receiver sensitivity (RS) of the Wi-SUN protocol and an energy-detection (ED) threshold of the Wi-Fi HaLow protocol, wherein the ED CCA control process permits the transmission when the detected energy level of the wireless signal is less than the α-fair ED threshold.

16. The non-transitory computer-readable medium of claim 15, wherein the ED CCA control process does not permit the transmission when the detected energy level of the wireless signal is greater than the ED threshold.

17. The non-transitory computer-readable medium of claim 16, wherein when the detected energy level of the wireless signal is greater than the α-fair ED threshold but less than the ED threshold, the ED CCA control process determines if the transmission is permitted according to a computation result of an optimal α-fairness solution of a predetermined object function.

18. The non-transitory computer-readable medium of claim 17, wherein the predetermined objective function is expressed by $$V(P_1, P_2) = \frac{1}{1-\alpha}\left[P_1^{1-\alpha}\frac{U_1^{1-\alpha}}{U_1^{1-\alpha}+U_2^{1-\alpha}} + P_2^{1-\alpha}\frac{U_2^{1-\alpha}}{U_1^{1-\alpha}+U_2^{1-\alpha}}\right]$$

$$Pi \geq 0, \quad i=1,2, \alpha > 0, \quad \alpha \neq 1$$

wherein $P_1+P_2=1$, $P_1$ is a permissible probability of the transmission, $P_2$ is an impermissible probability of the transmission, α is a parameter to control fair channel access allocation between the Wi-Fi HaLow network and the LR-WPAN, $U_1$ and $U_2$ are network utilities of the Wi-Fi HaLow network and the LR-WPAN, respectively.

19. The non-transitory computer-readable medium of claim 14, further comprising:
   storing a second program that causes the one or more computers to perform a Q-Learning backoff control process for determining if the transmission is permitted based on a computation result of a reinforcement learning (Q-Learning) objective function.

20. The non-transitory computer-readable medium of claim 19, further comprising:
   storing a selection threshold for selecting the first program or the second program based on the detected energy level of the wireless signal.

* * * * *